G. A. WALKER.
GRAIN-BINDER.
No. 190,936.
3 Sheets—Sheet 3.
Patented May 15, 1877.
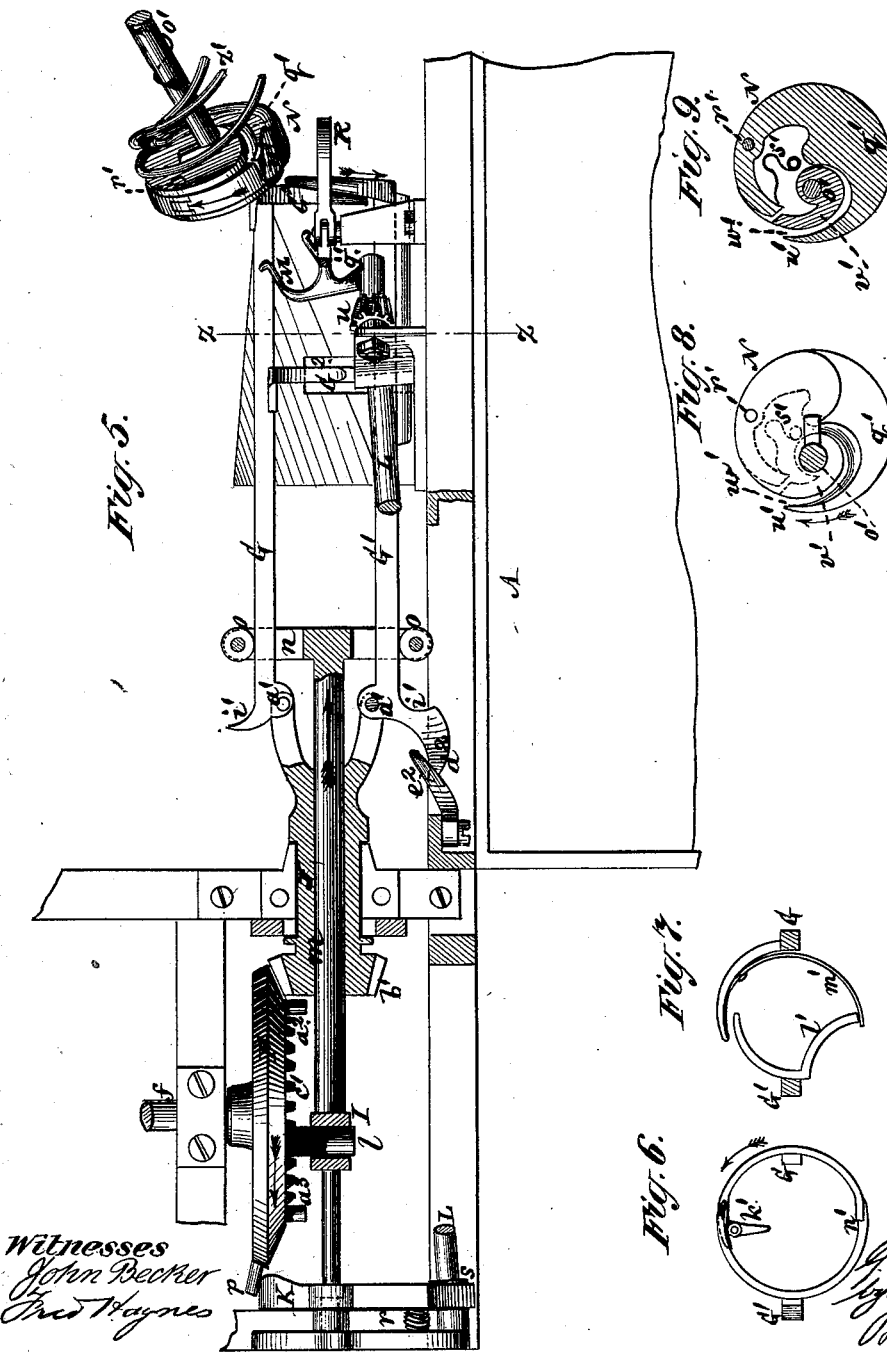

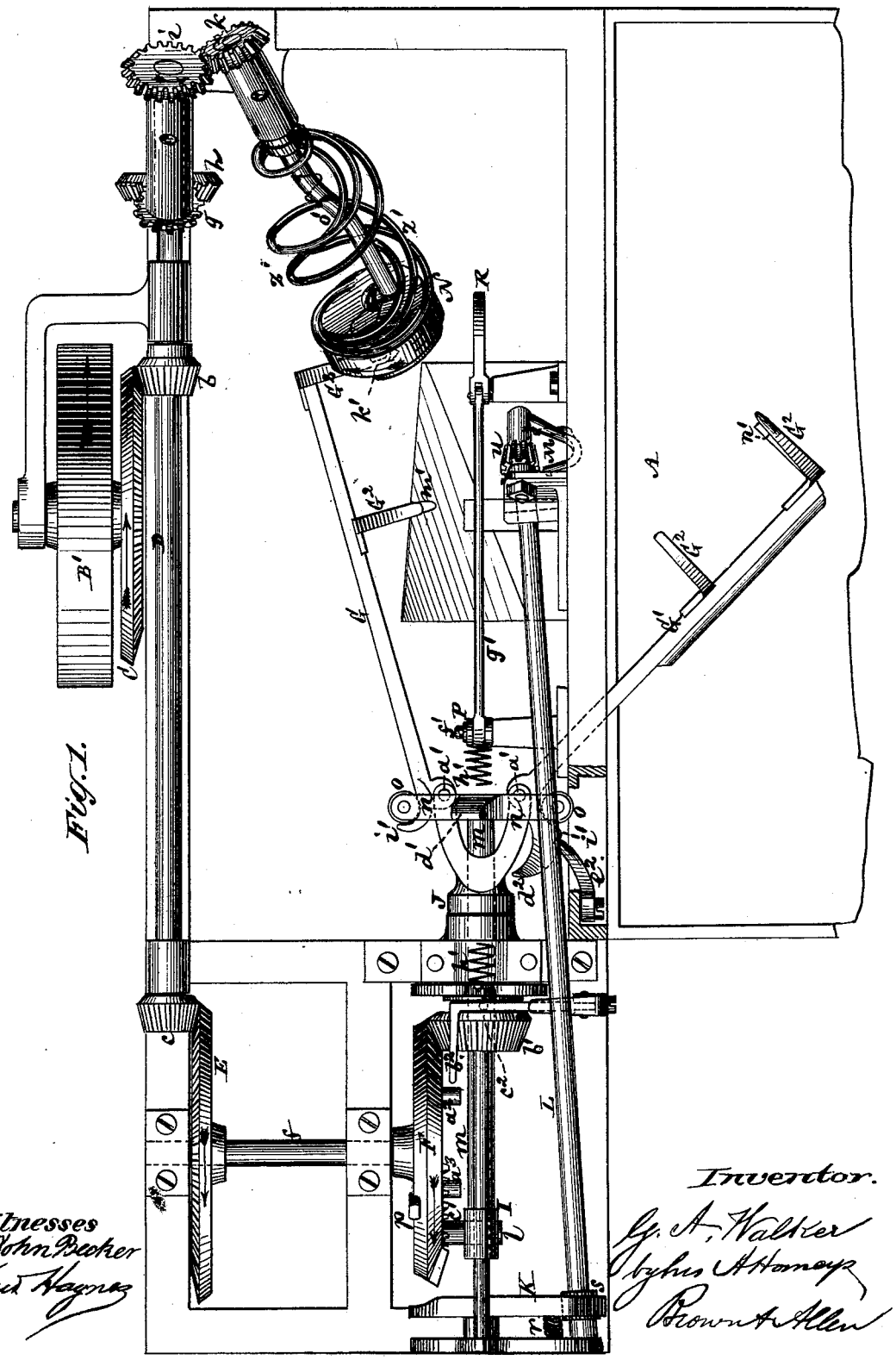

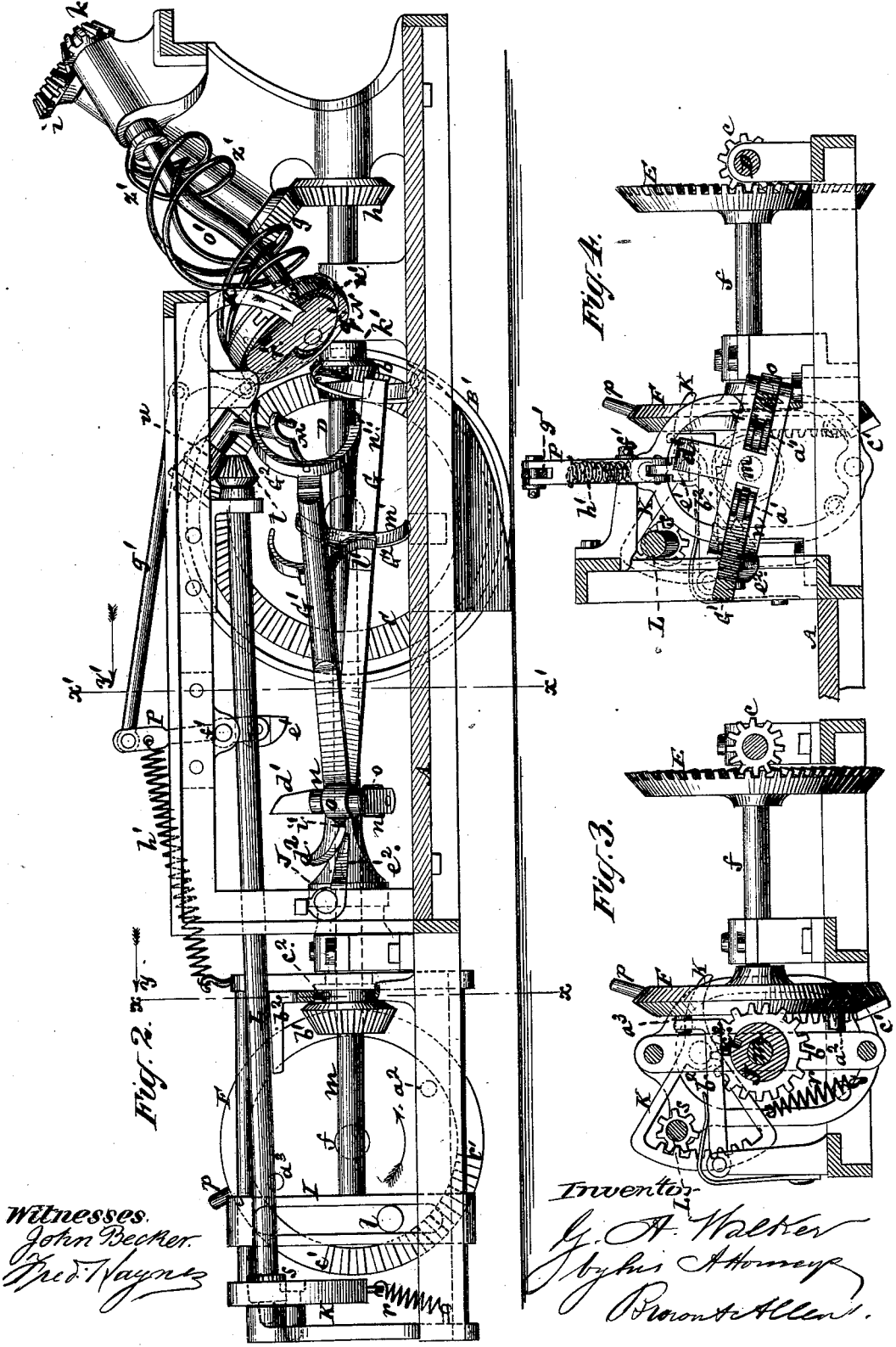

UNITED STATES PATENT OFFICE.

GEORGE A. WALKER, OF DANE'S HILL, NEAR RETFORD, ENGLAND.

IMPROVEMENT IN GRAIN-BINDERS.

Specification forming part of Letters Patent No. 190,936, dated May 15, 1877; application filed April 9, 1877.

*To all whom it may concern:*

Be it known that I, GEORGE AGARS WALKER, commonly called JOHN GEORGE AGARS WALKER, of Dane's Hill, near Retford, in the county of Notts, England, have invented new and useful Improvements in Reaping-Machines and apparatus connected therewith for binding up the sheaves as they are cut, which improvements are fully set forth in the following specification, reference being had to the accompanying drawings.

This invention has for its object the gathering together of the grain as it leaves the knives of the reaping-machine, forming the same into a sheaf, spinning the band, and tying up the sheaf ready for stacking.

The invention consists in various novel constructions and combinations of parts for accomplishing the above-named object, the same including gripers which gather up the grain into the form of a sheaf, a band-twister or spinner, a fork for detaching certain portions of the grain gathered by the gripers and conveying the same to the spinner to form the band and to twist it around the sheaf, and a device for tucking the ends of the band into the sheaf to complete the tying up of the latter, together and in combination with certain means or mechanism for operating these grain gathering and binding devices, substantially as hereinafter described, and so that on each opening of the gripers a perfectly-bound sheaf is delivered from or by them.

In the drawings, Figure 1 represents a plan of a reaping machine or harvester in part, having my invention applied. Fig. 2 is a side view from the platform side of the machine. Fig. 3 is a transverse section on the line $x\ x$, looking in direction of the arrow $y$, and Fig. 4 a further transverse section on the line $x'\ x'$, looking in direction of the arrow $y'$. Fig. 5 is a sectional plan of the machine in part, showing the gripers in a closed position. Fig. 6 is an end view of said gripers, which gather the grain from the platform and collect it into a sheave, and Fig. 7 a transverse section of said gripers on the line $z\ z$. Fig. 8 is a rear view of the band-twister, and Fig. 9 a transverse section thereof.

Prior to describing the drawings, it will here be observed that the invention is not restricted to any particular kind of reaping-machine, and that various self-raking devices may be incorporated with the machine for delivering the cut grain to the gripers which collect such delivered grain from the platform and form it into a sheave.

A is the platform of the machine, and B' that one of the main running or supporting wheels which is the driver of the mechanism. C is a bevel-wheel, arranged to rotate in common with the wheel B', and serving to give motion by a pinion, $b$, to a shaft, D. On this shaft D is a bevel-pinion, $c$, which gears with a wheel, E, the shaft $f$ of which carries a disk or circular plate, F. This plate is a primary means for actuating the gripers and other devices connected with my invention, but not the band-twister, which may receive its rotary motion from the shaft D by wheels and pinions $g\ h\ i\ k$.

The gripers are mainly composed of arms G G¹ and jaws or gripers proper G², which gather the grain as it leaves the self-raking apparatus or other suitable delivery mechanism, as the case may be, and press together the requisite amount of grain to form a sheaf. For this purpose said gripers are opened and closed, as shown in Figs. 1 and 5.

The motion of closing the griper-arms G G¹ is effected as follows: A pin, $l$, on the rotating plate F, gives reciprocating motion to a slotted cross-head, I, which is suitably guided to move in a straight path or direction, and is connected at its center to a rod, $m$, that is fitted to slide through a revolving bush, J, and is connected at its opposite end with a boss, supporting two plates, $n\ n$, forming cross-bars. These cross-bars are connected with each other at their ends by friction-rollers $o\ o$, against which the backs of the griper-arms G G¹ bear and move. The rod $m$ is continually sliding backward and forward at right angles to the axis of the revolving plate F, and one sheaf is made during each stroke of it.

Immediately the gripers G² have gathered the grain up into a compact sheaf, a lug or projection, $p$, on the revolving plate F, comes into contact with a toothed segment-lever, K, and moves said lever a short distance, as against the tension of a spring, $r$. This segment-lever, in being thus moved, gives a partial turn, through a pinion, s, to a shaft, L, which is geared at its opposite end, by pinions t and u, with a vibrating cranked fork, M. The motion thus acquired moves the fork M across the sheaf, and detaches some end portions of the straw or grain and places them in position for the band spinner or twister N to commence to make the band. After the fork M has held the straw to the band-spinner N a sufficient time the toothed segment-lever K ceases to be in contact with the lug p, and the spring r, acting on said lever, pulls its back to its normal position in readiness to commence operations on the next sheaf. Figs. 1 and 5 show the fork M in its two different positions; likewise the gripers, by their arms G G¹, as opened and closed.

The band spinner or twister N (shown in Figs. 1, 2, and 5, also in detail in Figs. 8 and 9) has a constant rotary motion by means of the gears $g$ $h$ $i$ $k$, and, catching hold of the straw detached by the fork M, as hereinbefore described, twists said straw to form the band, the sheaf carried by the gripers G², which are then closed simultaneously, having an intermittent rotary motion in a reverse direction to that of the band-twister. This intermittent rotary motion of the gripers is effected as follows: The griper-arms G G¹ are pivoted at $a^1$ to the bush J on opposite sides of the axis of the latter, and on the opposite end of said bush is secured a bevel-pinion, $b^1$, with which a toothed segment, $c'$, on the rotating plate F, gears.

The sheaf carried by the closed gripers, being thus caused to rotate at distinct intervals from or in a reverse direction to the band-spinner N, pulls the band underneath it up on the opposite side, said band, however, which has, to a certain extent, been made from the straggling straws which surround the sheaf, and which the band spinner or twister hooked up as they were brought to it, being still fast in the sheaf.

When the sheaf has completed its revolution, and the toothed segment $c'$ has cleared the pinion $b^1$, the band being still held by the spinner or twister N, the cross-bars $n$ $n$ are on their return or back stroke along the griper-arms G G¹, by the action or movement of the sliding link I and its rod $m$ toward the segment-lever K; and when, during such movement, a tooth or projection, $d'$, on one of the cross-bars $n$ $n$ comes into contact with a jointed nose-piece, $e^1$, of a lever, P, having its fulcrum at $f'$, it moves said lever a given distance, and then passes by or back of the lever. This movement of the lever P causes a curved tucker or bent lever, R, which is connected with the lever P by a rod, $g'$, to be moved downward and inward, relatively to the sheaf in the closed gripers, and thereby to take the band from the spinner N and tuck it into the sheaf. After the projection $d'$ has passed back of the lever P a spring, $h'$, returns said lever and the tucking arm or lever R to their normal positions.

A weight may be substituted for said spring, and a roller for the tooth or projection $d'$; also, the pivoted nose-piece $e'$, which swings out of the way when the projection $d'$ passes it in a reverse direction to that just described, may be dispensed with, and other changes in matters of detail pertaining to these devices be made.

As the sliding rod $m$ completes its back stroke or action, the cross-bars $n$ $n$ or rollers $o$ $o$ carried thereby come into contact with curved back extensions $i'$ $i'$ of the griper-arms G G¹, and open said arms to their required distance to allow the sheaf to roll off the platform, which may be furnished with an incline to facilitate clearance therefrom.

The gripers G², end views of which are shown in Figs. 6 and 7, are joined at their sides to the griper-arms G G¹. One half or section of the outer end griper, G², is fitted internally, at the portion which would be the top of the griper before it commences to revolve, with a small jointed pin or hinged tooth, $k'$, constructed with a square shoulder on one side of its pivot to form a stop. This pivoted tooth serves to push a portion of the grain toward the opposite half or section of said griper when the griper-arms G G¹ are closing, to insure at all times a portion of the grain being in the exact position required for the fork M to turn it over to the spinner N. The pin or tooth $k'$ also gives a firm hold to the end of the band in the sheaf, and prevents too rapid gathering by the band-spinner.

The other or inner griper, G², has its half or section, which is fast to the arm G¹, formed with a curved arm, $l'$, which serves to keep the sheaf up in a compact form, and lifts the mass, when the sheaf is a small one, to keep the straw sufficiently high for the fork M to get hold of it.

The outer end of the griper G² may be flattened at its top, to keep the sheaf down from the spinner when the sheaf has been turned round and the band made, so as to give the spinner an opportunity of finishing the band by keeping clear of the sheaf.

An elastic arm or spring, $m'$, with which the other griper is provided, acts to insure the grain being brought into position for the fork M to take hold of the same.

A stop, $n'$, on one of the gripers is employed to prevent the sheaf being pressed up too much.

The band-spinner N, which may be variously constructed in matters of detail, is set inclining, in order that the band may be spun as nearly direct as possible from the center of the spinner, and so that it will not drag down from the spinner. The one griper-arm G may, if desired, be stationary, and the sheaf be delivered by means of a falling or tilting platform.

The manner of gathering the straw from the sheaf to form the band is always the same, viz: The spinner, being always in motion, takes a portion of the straw held up to it by the fork M. The sheaf then revolves by means of the gripers, and the band winds away from the spinner, which finds fresh material from the sides of the sheaf, but finishes the band as the gripers, having the sheaf within them, complete a revolution, there being then no more material for the spinner to get hold of. The curved arm or tucker R then descends and tucks the end of the band into the sheaf.

Figs. 8 and 9 show one manner in which the band spinner or twister N may be constructed. Thus, the spinner, which is generally of circular form, and is fast on the lower end of the inclined spindle $o'$, by which it is rotated, is fitted with a curved hook, $q'$, which is made to more or less encircle said spindle, and is pivoted at $r'$ to the heads or face-plates of the spinner. A spring, $s'$, within the hook, and pressing, at its free end, on the rear extension of the hook, serves to keep the nose $u'$ of it pressed outward from a guard, $v'$, fast on the spindle $o'$. The mouth of the spinner is where the nose of the hook extends over or on the outside of the guard, and this mouth is extended back to form a curved slot or throat, $w'$, (see Figs. 8 and 9,) between the inner surface of the front portion of the hook and the outer or adjacent surface of the guard, which is of cam shape. As the spinner is rotated and takes up the straw, the latter acts automatically on the hook to close the mouth of the spinner whenever sufficient straw to make a band has been received within the curved slot or throat $w'$ of the spinner. The capacity of the spinner to receive straw may be regulated by making the guard $v'$ adjustable, to vary the size of the curved slot or throat $w'$.

It is desirable, in order to control the straws in passing through the band-spinner, to place a series of coiled wires, $z'$, to form a guard around the spindle $o'$, said wires being attached at one end to the spinner itself and at their other end to the spindle $o'$. Any other form of guard, however, may be used.

To insure the bevel-pinion $b^1$ of the bush J and toothed segment $c'$ on the plate F coming into gear at the proper moment, and to prevent their teeth improperly meeting or striking each other as they come into gear, I arrange on the rotating plate F a stud, $a^2$, which, immediately before the segment $c^1$ comes into gear, lifts a spring-lever, $b^2$, and releases a pin, $c^2$, fast on said lever, from a hole in the hub of the pinion $b^1$. The rotating plate also has another stud, $a^3$, which similarly releases the locking spring-lever $b^2$ at the moment the griper-arms are opening to allow of the gripers slightly turning, in order that the griper-arm $G^1$ next the platform, which is somewhat heavier than the arm G, may rise above the grain collected to form a sheaf, and descend after fully opening to take in, by its half gripers or jaws, the entire sheaf or quantity of grain on the platform necessary to form a sheaf. This raising of the griper-arm $G^1$, as it is spread out or opened, is effected by an incline, $d^2$, on the end of the back extension $i'$ of said griper-arm, riding over a hinged lifting-stop, $e^2$, and then dropping from off the point of the latter, which is free to rise or move out of the way when the incline $e^2$ strikes it in the closing of the griper-arm $G^1$. As soon as the griper-arm $G^1$, after being raised in opening, drops to its normal position, the spring-lever $b^2$ resumes its lock or hold on the pinion $b^1$ till the stud $a^2$ comes round to release it and allow of the segment $c$ coming into gear with said pinion.

The gripers are closed by the advance movement of the cross-bars $n$ $n$ over or along the griper-arms G $G^1$—that is, by the movement of said cross-bars toward the band spinner or twister N.

I claim—

1. The combination of the arms G $G^1$ with their attached gripers $G^2$, and the jointed pin or hinged tooth $k'$ of the rotating griping devices, the rotating disk or plate F, and mechanism actuated thereby for opening and closing the gripers, and the bevel-pinion $b$ and segment $c'$ for rotating the gripers, substantially as and for the purposes hereinbefore described.

2. The combination, with the rotating band-twister N and the gripers $G^2$, of the vibrating cranked fork M arranged for operation across the sheaf in the gripers and relatively to the rotating band-twister, essentially as and for the purposes herein set forth.

3. The combination of the intermittently-rotating gripers $g^2$ with the reversely-rotating band-twister N and the band-tucker R, substantially as shown and described.

GEORGE AGARS WALKER.

Witnesses:
J. G. TONGUE,
34 *Southampton Buildings, London, W. C.*
JOHN DEAN,
*No. 17 Gracechurch Street, London, E. C.*